United States Patent [19]
Wideman

[11] Patent Number: 5,559,982
[45] Date of Patent: Sep. 24, 1996

[54] METHOD AND APPARATUS FOR CONTROLLING STORAGE UTILIZATION

[75] Inventor: Roderick B. Wideman, Tucson, Ariz.

[73] Assignee: International Business Machines Corporation, Armonk, N.Y.

[21] Appl. No.: 419,563

[22] Filed: Apr. 10, 1995

[51] Int. Cl.[6] .................................................. G11B 17/22
[52] U.S. Cl. ........................... 395/438; 395/481; 395/490; 369/30
[58] Field of Search ..................................... 395/428, 438, 395/481, 490; 369/30; 360/92, 93

[56] References Cited

U.S. PATENT DOCUMENTS

| | | | |
|---|---|---|---|
| 5,277,534 | 1/1994 | Anderson et al. | 414/281 |
| 5,287,459 | 2/1994 | Gniewek | 395/438 X |
| 5,479,581 | 12/1995 | Kleinschnitz | 395/82 |

*Primary Examiner*—David L. Robertson
*Attorney, Agent, or Firm*—D. A. Shifrin

[57] ABSTRACT

The present invention provides a storage system having a programmable controller which recognizes the amount of storage capacity paid for by a customer, even if more physical capacity is actually installed. When the customer purchases additional capacity, the controller is directed to recognize the additional capacity and permit access thereto.

7 Claims, 1 Drawing Sheet

METHOD AND APPARATUS FOR CONTROLLING STORAGE UTILIZATION

TECHNICAL FIELD OF THE INVENTION

The present invention relates in general to controlling utilization of storage capacity in a data storage system and, in particular, to restricting storage capacity access to a authorized capacity.

BACKGROUND OF THE INVENTION

Data storage, whether fixed storage, such as solid state memory and direct access storage devices (DASD), or removable storage, such as magnetic media (diskette and tape) and optical media, is available in many capacities and, therefore, in many prices. Generally, a customer will purchase and install enough storage capacity to meet the customer's immediate and near term growth needs. When the customer's storage needs begin to exceed the existing capacity, the customer purchases and installs additional capacity. When the storage is DASD or other fixed media, expansion involves purchasing and installing additional DASD units. When the storage is removable media, expansion can be as simple as purchasing additional blank media.

In some situations, however, it may be more convenient (and ultimately less expensive) for the customer or the supplier to physically install storage capacity to meet the customer's current and expected longer term needs. If the customer cannot afford, or does not wish to pay for, the full capacity, the supplier may install the full capacity but charge the customer only for the smaller amount needed. Later, when the customer needs or can afford the additional capacity, the customer can purchase from the supplier the right to use the additional previously installed capacity.

It will be appreciated that, even if the customer agrees not to use the additional originally installed but unpurchased capacity, it may be difficult for the supplier to prevent the customer from doing so, thereby losing potential revenue. In the case of an automated data storage and retrieval library system for tape or optical media, it may be possible for the supplier to install empty storage racks and later install individual storage cells in the racks.

OBJECTS AND SUMMARY OF THE INVENTION

In view of the foregoing, it is an object of the present invention to provide a larger amount of storage capacity than a customer currently wants, allow the customer to pay for only a part of the installed capacity, and prevent the customer from utilizing the additional capacity without obtaining authorization from the supplier.

It is a further object to provide a programmable storage controller having a memory store retaining, in a tamper-resistant format, information about the authorized configuration of a storage system.

These and other objects are achieved in this invention by providing a storage system having a controller which recognizes the amount of storage capacity paid for by the customer, even if the actual physical capacity is larger. When the customer purchases additional capacity, the controller is directed to recognize the additional, previously installed capacity and permit access thereto.

In one embodiment, the storage system comprises an automated data storage and retrieval library system having a storage controller, one or more data drives, a storage module for housing data cartridges, an accessor for transporting a selected cartridge between the storage module and a data drive. The library also includes a memory store, such as a hard disk, non-volatile RAM or EPROM, which retains the serial number of the controller or the library and the current configuration, including the authorized (purchased) storage capacity.

When the customer desires to increase storage capacity, the supplier creates a diskette (or other piece of removable media) on which is recorded the controller's serial number, its current authorized storage capacity and the new storage capacity. The information on the diskette is read into the controller and compared with the original information. If the serial number and original capacity read from the diskette is the same as the serial number and original capacity stored in the library controller, the new configuration is read into the controller to replace the original configuration. The controller then permits access to the additional storage capacity.

The foregoing and other features and advantages of the invention will be apparent from the following more particular description of preferred embodiments of the invention, as illustrated in the accompanying drawings.

DETAILED DESCRIPTION OF THE INVENTION

Figure 1:
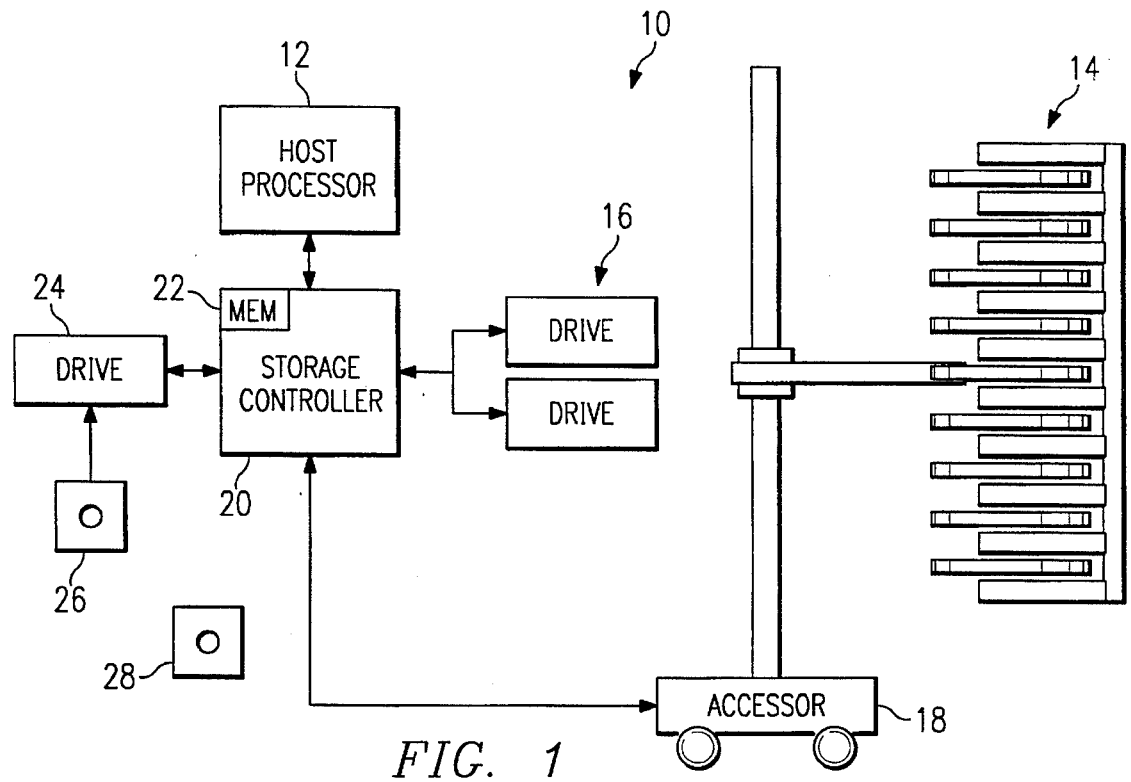
FIG. 1 is a block diagram of an automated data storage and retrieval library system of the present invention.

FIG. 1 is a block diagram of an automated data storage and retrieval library system 10 interconnected with a host device 12. The library 10 can be used, for example, to store optical disks or magnetic tape cartridges in racks of cells in a storage module 14. One or more data drives 16 read data from and record data to the data cartridges which are transported between the storage module 14 and the drives 16 by an accessor module 18. A storage controller 20 is interconnected with the host 12, the drives 16 and the accessor 18. The controller 20 receives read or write instructions from the host 12 and, in response, directs the accessor 18 to retrieve a selected cartridge from the storage module 14 and transport the cartridge to a selected drive 16 where data is read from or written to the cartridge. Upon completion of the read or write operation, the accessor 18 is directed to return the cartridge to the storage module 14.

The controller 20 includes a memory store 22, such as a hard drive, programmable read only memory (ROM) or other non-volatile memory, which retains the serial number of the library 10 (or of the controller 20) and the current library configuration, including the authorized, paid for capacity of the storage module 14. The authorized capacity can be less than the actual physical capacity. In addition, the controller 20 is interconnected with a data drive unit 24 capable of reading a piece of removable media 26. The data drive unit 24 can be a disk drive incorporated into the controller 20 or, alternatively, can be one of the drives 16 for reading magnetic tapes or optical disks if the drive is suitable for non-automated operation.

When the library 10 is first installed for a customer, a diskette 26 (or other suitable piece of removable media, as described above) is loaded into the drive 24 and read into the controller 20. The diskette 26 contains the serial number of the library 10 (or of the controller 20) and the current library configuration, including information about the authorized capacity of the storage module 14 for which the customer has paid. Such an operation "trains" the controller 20 for the particular hardware configuration which has been installed. Additionally, the controller 20 will "know" how much storage capacity, out of the total physical capacity installed in the storage module 14, the customer has purchased and is authorized to use. Consequently, the controller 20 will direct the accessor 18 to store cartridges only in the authorized portion of the storage module 14 (or in the entire storage module 14 if the total amount is authorized).

Figure 2:
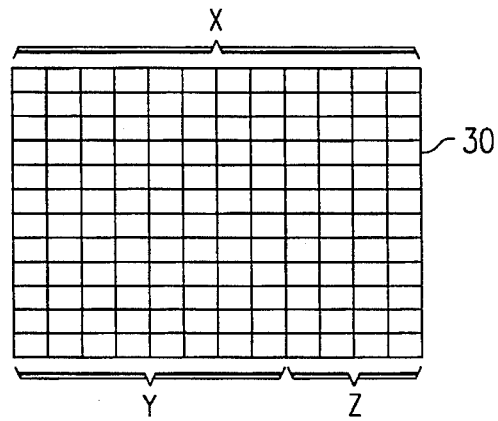
FIG. 2 is a schematic representation of a storage module of the present invention.

FIG. 2 is a schematic illustration of a storage module 30 which might be installed for a customer. The module illustrated has a total physical capacity of X cartridges. If the customer has an immediate need for fewer than X cartridges, for example Y cartridges, the supplier of the library 10 can record on the diskette 26 the serial number and the authorized storage capacity Y. This information is read by the controller 20 and stored in the memory 22. At a later time, if the customer wishes to upgrade and purchase the use of additional capacity Z, the supplier can create an upgrade diskette 28 having the serial number of the controller 20, the originally authorized capacity Y and the newly authorized capacity Y+Z. (In the storage module 30 illustrated in FIG. 2, the sum of Y+Z equals the total physical capacity X. However, the customer could instead purchase the use of less than the total remaining amount and in a second, later upgrade, acquire the right to use the balance.)

At the time of an upgrade purchase, the upgrade diskette 28 is loaded into the drive 24 and the information read into the controller 20. The serial number and original configuration (including authorized storage capacity) are compared with the corresponding information stored in the memory 22. If the information is the same, information about the new total authorized capacity Y+Z is recorded in the memory 22 in place of information about the previously authorized capacity Y. If, however, the information stored in the memory 22 differs from the corresponding information on the upgrade diskette 28, no additional storage capacity will be authorized. Thus, the customer is prevented from using the upgrade diskette 28 in other libraries (which would have different serial numbers) in order to avoid paying an upgrade fee.

Figure 3:
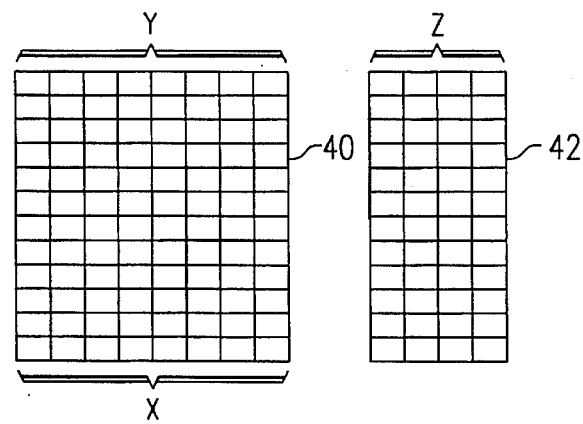
FIG. 3 is a schematic representation of another embodiment of a storage module of the present invention.

FIG. 3 illustrates a situation in which a customer is authorized to use the full physical capacity of a storage module 40 at the time of installation; that is, the authorized capacity Y equals the physical capacity X. When the customer desires to obtain additional capacity, a second storage module 42 can be installed with a physical capacity of Z, giving the customer a new total capacity of Y+Z. In order to utilize the new capacity, upgrade information from the upgrade diskette 28 must be loaded into the controller 20 and compared with the serial number and configuration information stored in the memory 22. If the information is the same, the new configuration information replaces the old and the controller 20 will be able to access the new storage module 42. If the information does not match, such as if the new storage module is installed in the wrong library 10, access to the new storage capacity Z will be denied.

In order to prevent tampering with the information recorded on the diskettes 26 or 28 (either the original diskette or the upgrade) or in the controller's memory store 22, the information is preferably encrypted using, for example, the serial number as an encoding key. For additional security, it is also preferable that the file containing the serial number and configuration information be a hidden file on the diskette, unreadable to any but a determined viewer.

In place of a diskette 26 or 28 being used by the supplier to initialize and upgrade the library 10, the serial number and library configuration can be transmitted to the controller 20 through a modem or other interconnection between the supplier and the controller 20.

While the invention has been particularly shown and described with reference to preferred embodiments thereof, it will be understood by those skilled in the art that various changes in form and details may be made therein without departing from the spirit and scope of the invention.

What is claimed is:

1. A method for enabling access to storage capacity in an automated storage and retrieval library system, comprising the steps of:

storing a library serial number and a first configuration, representative of a first authorized storage capacity Y purchased by a customer, in a memory of an automated storage and retrieval library acquired by the customer;

installing the library and providing the customer with access to the first authorized storage capacity Y;

when the customer desires to obtain additional storage capacity Z in excess of the first authorized storage capacity Y, recording onto a piece of removable media the library serial number, the first configuration and a second configuration, the second configuration representative of the sum of the first authorized storage capacity Y and the additional storage capacity Z;

loading the piece of removable media into the library and reading the library serial number and first configuration;

comparing the library serial number and first configuration read from the second piece of removable media with the library serial number and first configuration stored in the memory;

if the library serial number and first configuration read from the second piece of removable media and the library serial number and first configuration stored in the memory are the same, reading the second configuration from the piece of removable media and replacing the first configuration with the second configuration in the memory; and providing the customer with access to the first authorized storage capacity Y and the additional storage capacity Z.

2. The method of claim 1, wherein:

said step of installing the library includes the step of installing the library with an actual storage capacity X greater than the first authorized storage capacity Y; and the actual storage capacity X is at least as great as the sum Y+Z of the first authorized storage capacity and the additional storage capacity.

3. The method of claim 1, wherein:

said step of installing the library includes the step of installing the library having an actual storage capacity X equal to the first authorized storage capacity Y; and said step of providing the customer with access to the first authorized storage capacity Y and the additional storage capacity Z includes the step of physically adding the additional storage capacity Z to the library.

4. An automated data storage and retrieval system, comprising:

a storage module with cells for storing data cartridges and having an actual physical capacity of X cartridges;

a storage controller;

a device for reading data from data cartridges;

an accessor directed by said storage controller for retrieving and replacing data cartridges from and to any of a plurality Y of said cells, where $Y \leq X$ and Y represents the maximum number of data cartridges which are authorized to be stored in said storage module;

a memory store interconnected with said storage controller for storing a serial number of said storage controller and the authorized number Y;

whereby, if the actual physical capacity X of said storage module is greater than the authorized number Y, said controller prevents said accessor from retrieving from and replacing to said storage module more than Y data cartridges; and a piece of removable, recordable media on which is recorded the serial number of said storage controller, the authorized number Y, and a number Z, where $Y+Z \leq X$ and Y+Z represents a new maximum number of data cartridges which are authorized to be stored in said storage module.

5. A method for enabling access to storage capacity in an automated storage and retrieval library system, comprising the steps of:

storing a library serial number and a first configuration, representative of a first authorized storage capacity Y purchased by a customer, in a memory of an automated storage and retrieval library acquired by the customer;

installing the library, including a controller, and providing the customer with access to the first authorized storage capacity Y;

when the customer desires to obtain additional storage capacity Z in excess of the first authorized storage capacity Y, transferring to the controller the library serial number and the first configuration;

comparing the library serial number and the first configuration transferred to the controller with the library serial number the first configuration stored in the memory;

if the library serial number and first configuration transferred to the controller and the library serial number and first configuration stored in the memory are the same, transferring to the controller a second configuration, the second configuration representative of the sum of the first authorized storage capacity Y and the additional storage capacity Z, and replacing the first configuration with the second configuration in the memory; and providing the customer with access to the first authorized storage capacity Y and the additional storage capacity Z.

6. The method of claim 5, wherein:

said first transferring step comprises the step of recording the serial number and first configuration onto removable and reading such data from the removable media; and said second transferring step comprises the step of recording the second configuration onto removable and reading such data from the removable media.

7. The method of claim 5, wherein:

said first transferring step comprises the step of transmitting the serial number and first configuration to the controller through a modem; and said second transferring step comprises the step of transmitting the second configuration to the controller through a modem.

* * * * *